Patented Feb. 8, 1927. 1,617,060

UNITED STATES PATENT OFFICE.

HANS LANGER, OF BERLIN-CHARLOTTENBURG, GERMANY, ASSIGNOR TO I. G. FARBENINDUSTRIE AKTIENGESELLSCHAFT, OF FRANKFORT-ON-THE-MAIN, GERMANY.

METHOD OF PRODUCING TUBERCULOSIS PROTECTIVE AND CURATIVE MATERIAL.

No Drawing. Application filed September 28, 1925, Serial No. 59,196, and in Germany August 21, 1924.

It is known that tubercle bacilli increase in or upon artificial culture media materially slower than most of the other bacterial morbific agents.

It has now been found that by adding to artificial culture media organic substances having a poisoning effect upon bacteria, in such concentration as not to suppress the growth of the bacteria, there are obtained cultures, which when transferred upon culture media containing the poisonous substance not at all or in reduced proportions, furnish cultures excelling by rapid growth. It also has been observed that the cultures grown under the effects of the poisonous substances and the subcultures propagated therefrom show an increased virulence.

Such an increase in virulence can be observed already on initial cultures grown under the effects of irritants added to the culture media, when the irritant substance or poison is added in such small quantities that the bacterial growth is not impaired as compared with the growth upon culture media substantially free of poison. In this case an intermediate transoculation upon a mildly poisonous culture medium is not necessary.

Tubercle bacilli changed in the manner described both in regard to rate of growth and degree of virulence, furnish a basis for preparing by the usual method particularly effective preparations for protective inoculations and for the treatment of tuberculosis of man.

It has already been proposed to grow tubercle bacilli upon culture media containing poisonous substances, e. g. gold or arsenious compounds and to impart to the cultures appreciable quantities of the poison by gradually increasing the poison content and then to prepare therapeutic preparations from these poison-charged bacillus materials. In contradistinction to such prior proposal, the invention contemplates a single period of culture growth upon a medium containing a definite dose of an irritant or poison and preferably a further or second period of culture growth upon media containing substantially no poison. In this manner there may be obtained very young tubercle bacilli which do not contain any measurable quantities of the poison, but show a materially increased biological activity.

*Example.*—To glycerine bouillon is added methylene blue in such quantity that the color dilution is 1:300 000. Tubercle bacilli are inoculated and as soon as they commence to multiply, part of the new growth is transferred to ordinary glycerine bouillon. Within 3–5 days there is now formed an extensive bacterial growth which either alone or in conjunction with bacilli grown upon media containing methylene blue or other forms of poison, is handled in the usual manner to form preparations for inoculation, consisting of live, weakened or killed bacilli.

In similar manner, quinine may be used as poisoning substance. The dilution in that case may be in the ratio 1:75 000.

Claims:

1. Method of producing prolific cultures of tubercle bacilli comprising growing a culture of substantially pure tubercle bacilli upon a culture medium containing an organic bacterial poison specific to tubercle bacilli in such concentration as not completely to suppress the growth of said bacilli and transferring the cultures so obtained to a medium free from said poison.

2. Method of producing prolific cultures of tubercle bacilli according to claim 1, characterized in that the culture medium contains methylene blue in the proportion of 1 part of methylene blue to about 300,000 parts of the culture medium.

In testimony whereof I affix my signature.

HANS LANGER.